(12) United States Patent
Shimotani et al.

(10) Patent No.: US 9,069,453 B2
(45) Date of Patent: Jun. 30, 2015

(54) DISPLAY INPUT DEVICE

(75) Inventors: Mitsuo Shimotani, Tokyo (JP);
Tsutomu Matsubara, Tokyo (JP);
Takashi Sadahiro, Tokyo (JP); Masako Ohta, Tokyo (JP); Yuichi Okano, Tokyo (JP); Tsuyoshi Sempuku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1026 days.

(21) Appl. No.: 13/059,937

(22) PCT Filed: Nov. 26, 2009

(86) PCT No.: PCT/JP2009/006393
§ 371 (c)(1),
(2), (4) Date: Feb. 18, 2011

(87) PCT Pub. No.: WO2010/064389
PCT Pub. Date: Jun. 10, 2010

(65) Prior Publication Data
US 2011/0141066 A1    Jun. 16, 2011

(30) Foreign Application Priority Data
Dec. 4, 2008 (JP) ................................ 2008-309805

(51) Int. Cl.
*G06F 3/043* (2006.01)
*G06F 3/0488* (2013.01)
*G01C 21/36* (2006.01)
*G06F 3/042* (2006.01)
*G06F 3/044* (2006.01)
*G06F 3/0481* (2013.01)

(52) U.S. Cl.
CPC .......... *G06F 3/0488* (2013.01); *G01C 21/3664* (2013.01); *G06F 3/0421* (2013.01); *G06F 3/044* (2013.01); *G06F 3/0481* (2013.01); *G06F 3/04886* (2013.01); *G06F 2203/04101* (2013.01); *G06F 2203/04805* (2013.01)

(58) Field of Classification Search
None
See application file for complete search history.

(56) References Cited

U.S. PATENT DOCUMENTS

2004/0012579 A1* 1/2004 Nagasaka et al. ............. 345/204
2005/0275637 A1* 12/2005 Hinckley et al. ............. 345/173
2006/0161846 A1    7/2006 Van Leeuwen
(Continued)

FOREIGN PATENT DOCUMENTS

DE    100 00 218 A1    7/2001
DE    10 2006 037 156 A1    9/2007
(Continued)

*Primary Examiner* — Grant Sitta
*Assistant Examiner* — Kirk Hermann
(74) *Attorney, Agent, or Firm* — Birch, Stewart, Kolasch & Birch, LLP

(57) ABSTRACT

A display input device is comprised of a touch panel 1 for carrying out a display of an image and an input of an image, a vibration sensor (a proximity sensor 12) for detecting a vibration of an object to be detected which is positioned opposite to the touch panel 1, a vibration correcting unit 304 for making a vibration correction when the vibration of the object to be detected which is detected by the vibration sensor has an amount equal to or larger than a predetermined amount, and a control unit 3 for carrying out a process of transforming an image in a display area having a fixed range displayed on the above-mentioned touch panel according to the position of the object to be detected to which the above-mentioned vibration correction has been made.

12 Claims, 10 Drawing Sheets

(56) References Cited

U.S. PATENT DOCUMENTS

| | | | |
|---|---|---|---|
| 2008/0055259 A1* | 3/2008 | Plocher | 345/173 |
| 2009/0201246 A1* | 8/2009 | Lee et al. | 345/156 |
| 2009/0327977 A1 | 12/2009 | Bachfischer et al. | |

FOREIGN PATENT DOCUMENTS

| | | | |
|---|---|---|---|
| EP | 1980451 A1 * | 10/2008 | |
| JP | 4-128877 A | 4/1992 | |
| JP | 10-171600 A | 6/1998 | |
| JP | 2002-108564 A | 4/2002 | |
| JP | 2006-31499 A | 2/2006 | |
| JP | 2006-520024 A | 8/2006 | |
| JP | 2007-190947 A | 8/2007 | |
| JP | 2007190947 A * | 8/2007 | |
| JP | 2008-265544 A | 11/2008 | |
| WO | WO 96/11435 A1 | 4/1996 | |

* cited by examiner

FIG.6
(a)
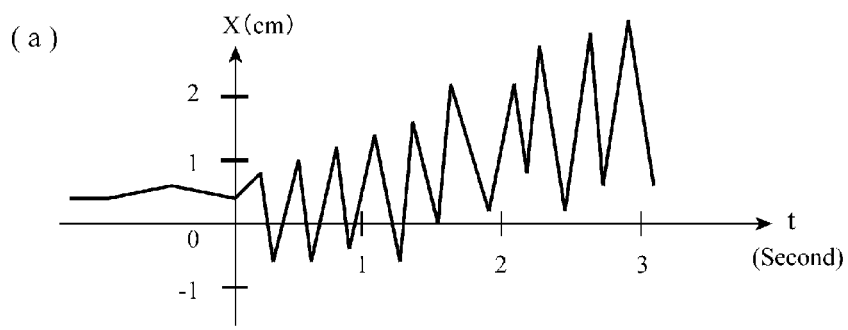
(b)
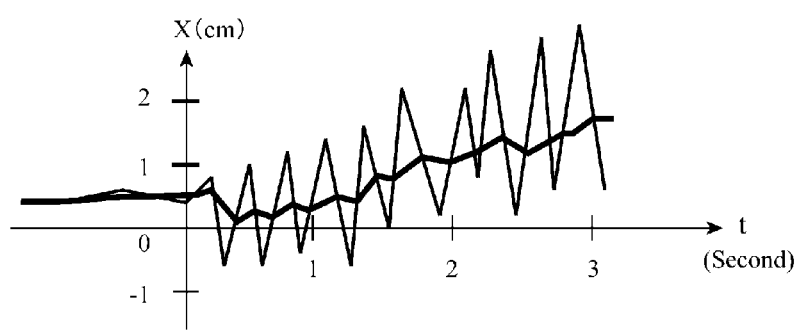

DISPLAY INPUT DEVICE

FIELD OF THE INVENTION

The present invention relates to a display input device which is particularly suitable for use in vehicle-mounted information equipment such as a navigation system.

BACKGROUND OF THE INVENTION

A touch panel is an electronic part which is a combination of a display unit like a liquid crystal panel, and a coordinate position input unit like a touchpad, and is a display input device that enables a user to touch an image area, such as an icon, displayed on the liquid crystal panel, and detects information about the position of a part of the image area which has been touched by the user to enable the user to operate target equipment. Therefore, in many cases, a touch panel is incorporated into equipment, such a vehicle-mounted navigation system, which has to mainly meet the need for the user to handle the equipment by following a self-explanatory procedure.

Many proposals for improving the ease of use and user-friendliness of a man-machine device including such a touch panel as mentioned above have been applied for patent.

For example, a display input device which, when a user brings his or her finger close to the device, enlarges and displays a key switch which is positioned in the vicinity of the finger so as to facilitate the user's selection operation (for example, refer to patent reference 1), a CRT device which detects a vertical distance of a finger and displays information with a scale of enlargement according to the distance (for example, refer to patent reference 2), an input unit which detects a touch pressure to implement an enlarged display when the touch is a light one and implement a predetermined key operation when the touch is a strong one (for example, refer to patent reference 3), and so on have been known.

RELATED ART DOCUMENT

Patent Reference

Patent reference 1: JP, 2006-31499, A
Patent reference 2: JP, 04-128877, A
Patent reference 3: JP, 10-171600, A

SUMMARY OF THE INVENTION

According to the technology disclosed by above-mentioned patent reference 1, because when a user brings his or her finger close to the touch panel, an enlarged screen display of an icon positioned in the vicinity of the position where the user's finger is close to the touch panel is created, operation mistakes can be prevented and the user is enabled to easily perform an operation of selecting the icon. When the screen vibrates because the vehicle is running, for example, assuming a case, as shown in FIG. 10, in which a software keyboard is displayed on the touch panel, it is undeniable that because some keys which are enlarged and displayed are replaced partially or totally by other keys as the screen vibrates, and it is therefore difficult for the user to perform a touch operation, the ease of use of the software keyboard is reduced. In contrast with this, there is a case in which an enlarged display of some keys of the software keyboard in a state in which the screen does not vibrate impairs the ease of use of the software keyboard.

Furthermore, according to the technology disclosed by patent reference 2, if the position of the finger is too far away from the touch panel face when trying to control the scaling, the scaling sways due to a vibration in the Z axial direction of the finger, and therefore the control operation may become difficult. In addition, a problem with the technology disclosed by patent reference 3 is that a user's quick finger operation is mis-recognized as a touch, and therefore the user's intention is not reflected sufficiently in operations.

The present invention is made in order to solve the above-mentioned problems, and it is therefore an object of the present invention to provide a display input device which makes it easy for a user to perform an input operation even when a vibration is occurring, thereby improving its ease of use.

In order to solve the above-mentioned problems, a display input device of the present invention includes: a touch panel for carrying out a display of an image and an input of an image; a vibration sensor for detecting a vibration of an object to be detected which is positioned opposite to the touch panel on a basis of a change in a position of the object to be detected; a vibration correcting unit for making a vibration correction to remove a vibration component from the change of the position of the object to be detected when the vibration of the object to be detected which is detected by the vibration sensor has an amount equal to or larger than a predetermined amount; and a control unit for carrying out a process of transforming an image in a display area having a fixed range displayed on the touch panel according to the position of the object to be detected to which the vibration correction has been made.

In accordance with the present invention, the display input device makes it easy for a user to perform an input operation even when a vibration is occurring, thereby improving its ease of use.

BRIEF DESCRIPTION OF THE FIGURES

FIG. 6 is a timing chart showing a vibration correcting process operation of the display input device in accordance with Embodiment 1 of the present invention;

EMBODIMENTS OF THE INVENTION

Hereafter, in order to explain this invention in greater detail, the preferred embodiments of the present invention will be described with reference to the accompanying drawings.

Embodiment 1

Figure 1:
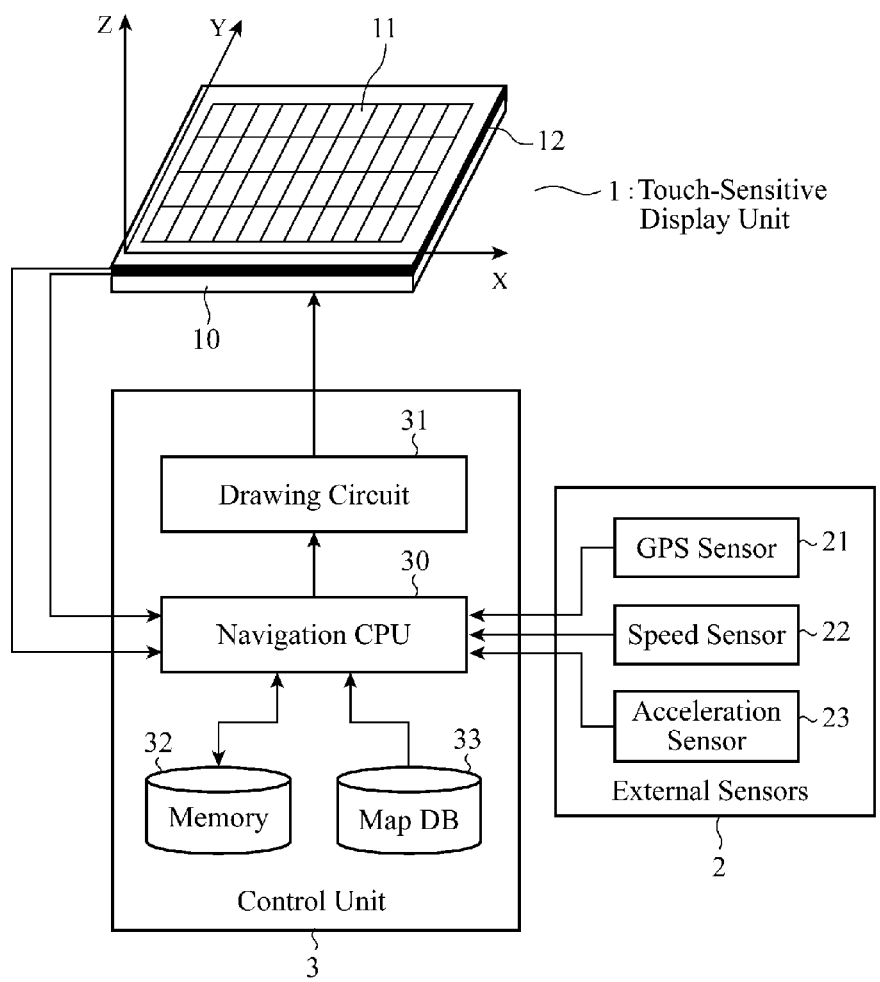
FIG. 1 is a block diagram showing the internal structure of a display input device in accordance with Embodiment 1 of the present invention.

FIG. 1 is a block diagram showing the structure of a display input device in accordance with Embodiment 1 of the present invention. As shown in FIG. 1, the display input device in accordance with Embodiment 1 of the present invention is comprised of a touch-sensitive display unit (abbreviated as a touch panel from here on) 1, external sensors 2, and a control unit 3.

The touch panel 1 carries out a display of information and an input of the information. For example, the touch panel 1 is constructed in such a way that a touch sensor 11 for inputting information is laminated on an LCD panel 10 for displaying information. In this embodiment, the touch panel 1 and a plurality of proximity sensors 12 each of which carries out non-contact detection in two dimensions of a movement of an object to be detected, such as a finger or a pen, which is positioned opposite to the touch panel 1 are mounted on a peripheral portion outside the touch sensor 11 on a per-cell basis. Hereafter, the proximity sensors 12 will be explained as a vibration sensor.

In a case in which each of the proximity sensors 12 uses an infrared ray, infrared ray emission LEDs (Light Emitted Diodes) and light receiving transistors are arranged, as detection cells, opposite to each other on the peripheral portion outside the touch sensor 11 in the form of an array. Each of the proximity sensors 12 detects a block of light emitted therefrom or reflected light which is caused by an approach of an object to be detected to detect the approach and also detects the coordinate position of the object.

The detection cells of the proximity sensors 12 are not limited to the above-mentioned ones each of which employs an infrared ray. For example, sensors of capacity type each of which detects an approach of an object to be detected from a change of its capacitance which occurs between two plates arranged in parallel like a capacitor can be alternatively used. In this case, one of the two plates serves as a ground plane oriented toward the object to be detected, and the other plate serves as a sensor detection plane, and each of the sensors of capacity type can detect an approach of the object to be detected from a change of its capacitance formed between the two plates and can also detect the coordinate position of the object.

On the other hand, the external sensors 2 can be mounted at any positions in a vehicle, and include at least a GPS (Global Positioning System) sensor 21, a speed sensor 22, and an acceleration sensor 23.

The GPS sensor 21 receives radio waves from GPS satellites, creates a signal for enabling the control unit 3 to measure the latitude and longitude of the vehicle, and outputs the signal to the control unit 3. The speed sensor 22 measures vehicle speed pulses for determining whether or not the vehicle is running and outputs the vehicle speed pulses to the control unit 3. The acceleration sensor 23 measures a displacement of a weight attached to a spring to estimate an acceleration applied to the weight, for example. In a case in which the acceleration sensor 23 is a three-axis one, the acceleration sensor follows an acceleration variation ranging from 0 Hz (only the gravitational acceleration) to several 100 Hz, for example, and measures the direction (attitude) of the weight with respect to the ground surface from the sum total of acceleration vectors in X and Y directions and informs the direction to the control unit 3.

The control unit 3 has a function of, when it is determined that a vibration of a finger detected by the proximity sensors 12 has an amount equal to or larger than a predetermined amount, making a vibration correction to the vibration, and enlarging an image in a display area having a fixed range which is displayed on the touch panel 1 to display the enlarged image, in addition to basic processing functions required to implement navigation functions, such as a route search and destination guidance.

To this end, the control unit 3 is comprised of a CPU (referred to as a navigation CPU 30 from here on) which mainly carries out navigation processing and controls the touch panel 1, a drawing circuit 31, a memory 32, and a map DB (Data Base) 33.

The navigation CPU 30 carries out a navigation process of, when a navigation menu, such as a route search menu, which is displayed on the touch panel 1 is selected by a user, providing navigation following the menu. When carrying out the navigation process, the navigation CPU 30 refers to map information stored in the map DB 33, and carries out a route search, destination guidance or the like according to various sensor signals acquired from the external sensors 2.

Figure 2:
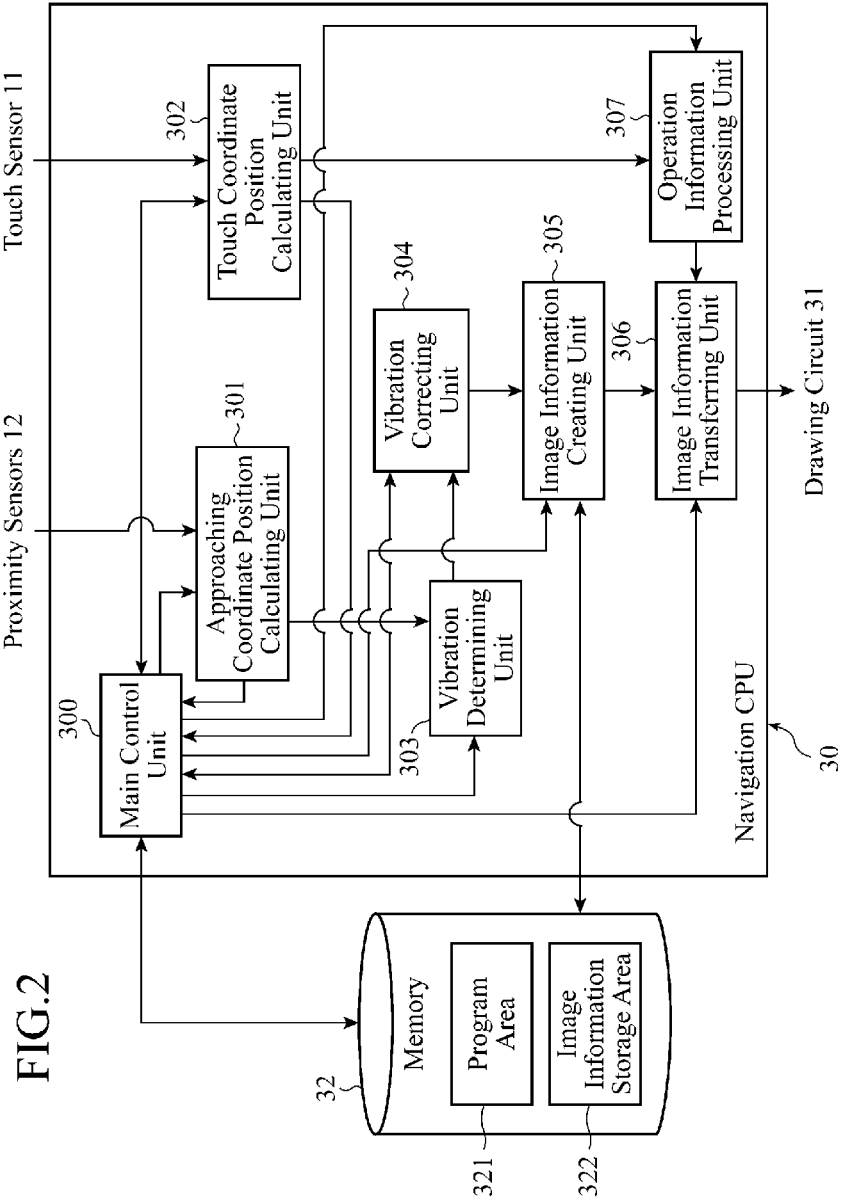
FIG. 2 is a block diagram showing a functional development of the program structure of a navigation CPU which the display input device in accordance with Embodiment 1 of the present invention has.

Furthermore, in order to implement the control unit 3's function of, when it is determined that the vibration of a finger detected by the proximity sensors 12 has an amount equal to or larger than the predetermined amount, making a vibration correction to the vibration and enlarging an image in a display area having a fixed range which is displayed on the touch panel 1 to display the enlarged image, the navigation CPU 30 creates image information and controls the drawing circuit 31 according to a program stored in the memory 32. The structure of the program which the navigation CPU 30 executes in that case is shown in FIG. 2, and the details of the structure will be mentioned below.

Figure 3:
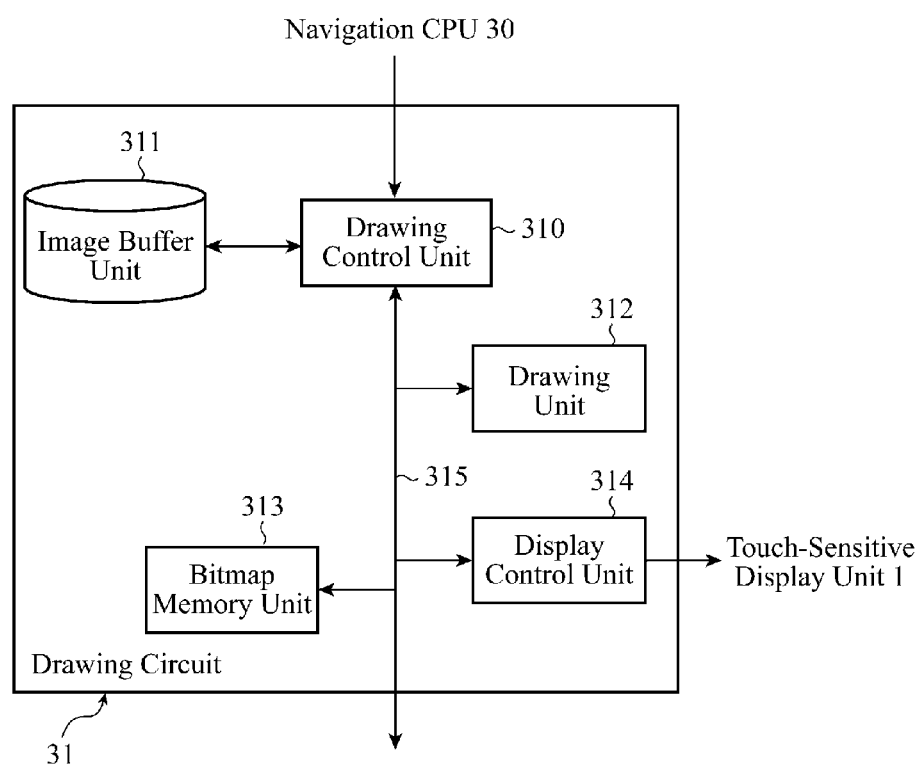
FIG. 3 is a block diagram showing the internal structure of a drawing circuit which the display input device in accordance with Embodiment 1 of the present invention has.

The drawing circuit 31 expands the image information created by the navigation CPU 30 on a bit map memory unit built therein or mounted outside the drawing circuit at a fixed speed, reads image information which is expanded on the bit map memory unit by a display control unit similarly built therein in synchronization with the display timing of the touch panel 1 (the LCD panel 10), and displays the image information on the touch panel 1. The above-mentioned bit map memory unit and the above-mentioned display control unit are shown in FIG. 3, and the details of these components will be mentioned below.

An image information storage area and so on are assigned to a work area of the memory 32, which is provided in addition to a program area in which the above-mentioned program is stored, and image information are stored in the memory 32.

Furthermore, maps, facility information and so on required for navigation including a route search and guidance are stored in the map DB 33.

FIG. 2 is a block diagram showing a functional development of the structure of the program which the navigation CPU 30 of FIG. 1, which the control unit 3 of the display input device in accordance with Embodiment 1 of the present invention has, executes.

As shown in FIG. 2, the navigation CPU 30 includes a main control unit 300, an approaching coordinate position calculating unit 301, a touch coordinate position calculating unit 302, a vibration determining unit 303, a vibration correcting unit 304, an image information creating unit 305, an image information transferring unit 306, and an operation information processing unit 307.

The approaching coordinate position calculating unit 301 has a function of, when the proximity sensors 12 detect an approach of a finger to the touch panel 1, calculating the XY coordinate position of the finger and delivering the XY coordinate position to the main control unit 300 and the vibration determining unit 303.

The XY coordinates calculated by the approaching coordinate position detecting unit 301 are outputted continuously at intervals of 0.01 seconds during a time period of 0.1 seconds, for example. When there is little change in the XY coordinate value during the time period of 0.1 seconds, the vibration determining unit 303 determines that the finger does not have any vibration, whereas when there is a change of a predetermined amount or more in the XY coordinate value, the vibration determining unit determines that the finger has a vibration and controls the image information creating unit 305 via the main control unit 300. For the convenience of this explanation, although it is described that the vibration determining unit determines whether the finger has a vibration during 0.1 seconds, the vibration determining unit can keep a history of some continuously-performed determinations of whether the finger has a vibration during 0.1 seconds and determine whether the finger has a vibration from the several pieces of information each about the determination during a time period of 0.1 seconds, thereby further improving the accuracy of the determination.

The touch coordinate position calculating unit 302 has a function of, when the touch sensor 11 detects a touch of a finger on the touch panel 1, calculating the XY coordinate position of the touch and delivering the XY coordinate position to the main control unit 300.

The vibration determining unit 303 measures the amount of vibration of the finger from the changing state of the XY coordinates of the finger outputted from the approaching coordinate position calculating unit 301 under the control of the main control unit 300 to determine whether the finger has a vibration whose amount is equal to or larger than the predetermined amount.

The vibration determining unit 303 stores a time series of measurements of the XY coordinates of the finger which are outputted from the approaching coordinate position calculating unit 301 during a predetermined time period, and inputs the time-series data to an HPF (high pass filter) to remove low-frequency components from the time-series data and acquire time-series data showing the vibration of the finger. Then, when this time-series data showing the vibration of the finger has a variance having a predetermined value or larger, the vibration determining unit determines that the finger has a vibration and controls the vibration correcting unit 304 according to the result of the determination.

When the vibration determining unit 303 determines that the vibration of the finger has an amount equal to or larger than the predetermined amount, the vibration correcting unit 304 performs a filtering process with a predetermined cut-off frequency on the time-series data showing the vibration of the finger which are acquired by the vibration determining unit 303 to make a vibration correction to the time-series data. The vibration correcting unit thus acquires time-series data showing the XY coordinates of the finger from which the vibration component has been removed, and outputs the time-series data to the image information creating unit 305. In contrast, when the vibration determining unit 303 determines that the finger does not have any vibration whose amount is equal to or larger than the predetermined amount, the vibration correcting unit outputs the time-series data showing the XY coordinates of the finger on which no vibration correction has been performed to the image information creating unit 305.

The image information creating unit 305 has a function of creating image information to be displayed on the touch panel 1 (the LCD panel 10) under the control of the main control unit 300, and outputting the image information to the image information transferring unit 306. In this case, the image information creating unit 305 carries out the process of enlarging an image in an area having a fixed range in the vicinity of the finger to display the enlarged image with reference to the time-series data showing the XY coordinates of the finger inputted from the vibration determining unit 303. In order to carry out the process of enlarging an image in a display area having a fixed range which is displayed on the touch panel 1 to display the enlarged image, the image information creating unit 305 reads an already-created image in the display area having the fixed range on a per-pixel basis while skipping at fixed intervals of some pixels, and interpolates intermediate pixels to draw an image as an updated image, for example. For example, the image information creating unit 305 copies the value of each pixel of the original image to each of the four values of an array of two rows and two columns when enlarging the original image to twice of its original size. In contrast with this, when reducing the original bitmap image, the image information creating unit thins out the pixels of the original bitmap image by skipping at fixed intervals of some pixels. The image information creating unit then transfers the updated image to the drawing circuit 31. Although the method of enlarging or reducing the original bitmap image is explained as an example, in a case of processing a vector image instead of a bit image, the vector image can be enlarged or reduced to a more beautiful image through a predetermined enlarging and reducing computation.

The image information transferring unit 306 has a function of transferring the image information created by the image information creating unit 305, as well as a drawing command, to the drawing circuit 31 under the timing control of the main control unit 300.

The operation information processing unit 306 has a function of creating operation information defined for an icon which is based on the coordinate position of the touch calculated by the touch coordinate position calculating unit 302, outputting the operation information to the image information transferring unit 304, and then displaying the operation information on the touch panel 1 (the LCD monitor 10) under the control of the main control unit 300. For example, when the icon is a key of a soft keyboard, the operation information processing unit 306 creates image information based on the touched key, outputs the image information to the image information transferring unit 306, and then displays the image information on the touch panel 1. When the icon is an icon button, the operation information processing unit 306 carries out a navigation process defined for the icon button, such as a destination search, creates image information, outputs the image information to the image information transferring unit 306, and then displays the image information on the touch panel 1.

The work area having a predetermined amount of storage, in addition to the program area 321 in which the above-mentioned program is stored, is assigned to the memory 32. In this work area, the image information storage area 322 in which the image information created by the image information creating unit 305 is stored temporarily is included.

FIG. 3 is a block diagram showing the internal structure of the drawing circuit 31 shown in FIG. 1. As shown in FIG. 3, the drawing circuit 31 is comprised of a drawing control unit 310, an image buffer unit 311, a drawing unit 312, the bitmap memory unit 313, and the display control unit 314. They are commonly connected to one another via a local bus 315 which consists of a plurality of lines used for address, data and control.

In the above-mentioned construction, the image information transferred from the navigation CPU 30 shown in FIG. 2 (the image information transferring unit 304) is held by the image buffer unit 311 under the control of the drawing control unit 310, and the drawing control unit 310 decodes a command such as a straight line drawing command or a rectangle drawing command, or carries out preprocessing about the slope of a line or the like prior to a drawing process. The drawing unit 312, which is started by the drawing control unit 310, then carries out high-speed drawing of the image information decoded by the drawing control unit 310 into the bitmap memory unit 313.

The display control unit 314 then reads and displays the image information held by the bitmap memory unit 313 in synchronization with the display timing of the LCD panel 10 of the touch panel 1.

Figure 4:
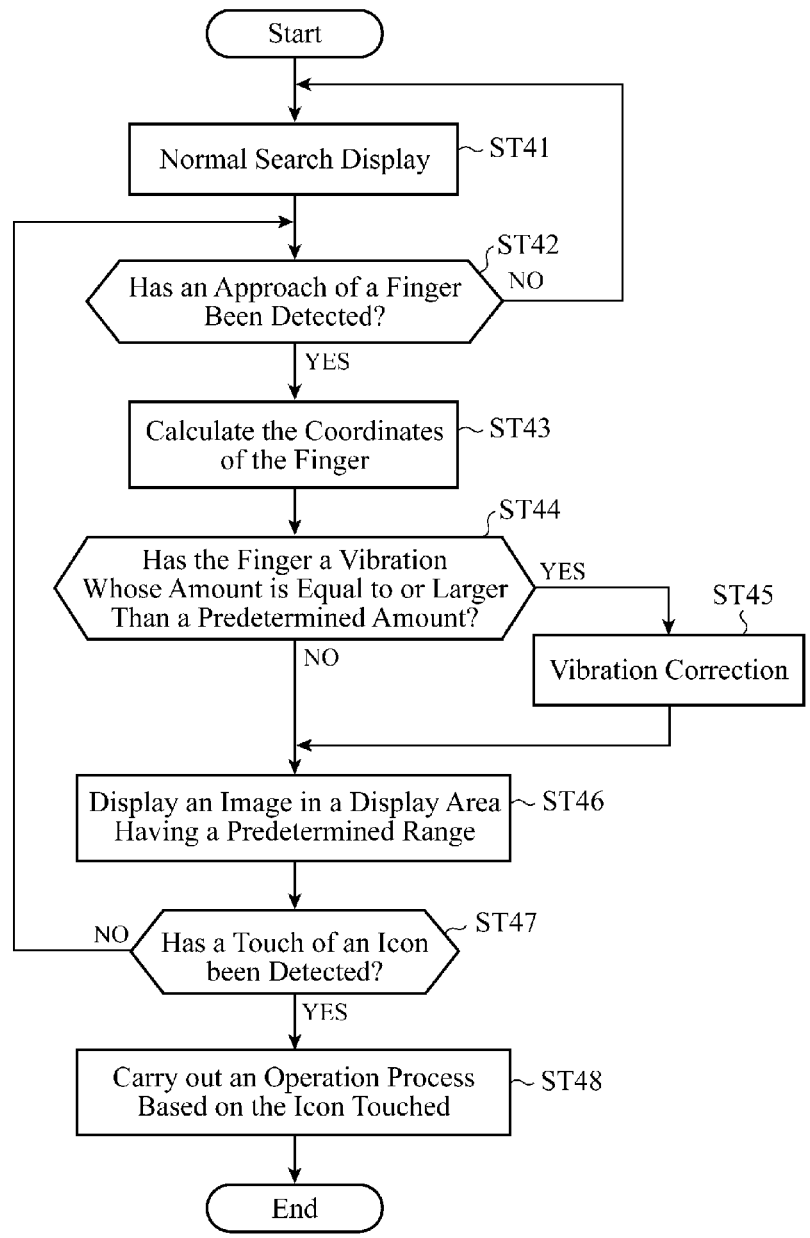
FIG. 4 is a flow chart showing the operation of the display input device in accordance with Embodiment 1 of the present invention.

FIG. 4 is a flow chart showing the operation of the display input device in accordance with Embodiment 1 of the present invention. Furthermore, FIG. 5(a) is a view showing an example of a soft keyboard image displayed on the touch panel 1 at that time, and FIG. 5(b) is a view showing an example of a cursor image.

Hereafter, the operation of the display input device in accordance with Embodiment 1 of the present invention shown in FIGS. 1 to 3 will be explained in detail with reference to FIGS. 4 and, 5(a) and 5(b).

In the flow chart of FIG. 4, a soft keyboard image used at the time of a facility search based on a phonetic alphabet of 50 characters as shown in FIG. 5(a) is displayed on the touch panel 1, for example (step ST41).

In this state, when a user brings his or her finger close to the touch panel 1 first, the proximity sensors 12 detects the approach of the finger (if "YES" in step ST42), and the approaching coordinate position calculating unit 301 of navigation CPU 30 starts operating. The approaching coordinate position calculating unit 301 calculates the X (Y) coordinate of the finger on the panel surface of the touch panel 1, and outputs the coordinate calculated thereby to the vibration determining unit 303 (step ST43). For example, the approaching coordinate position calculating unit 301 outputs the coordinate of the finger acquired thereby to the vibration determining unit 303 every 0.01 second only during a time period of 0.1 seconds.

The vibration determining unit 303 determines whether the finger has a predetermined amount or more of vibration by receiving the coordinate of the finger inputted thereto continuously during the time period of 0.1 seconds (step ST44).

When the vibration determining unit 303 determines that the vibration of the finger has an amount equal to or larger than a predetermined amount (if "YES" in step ST44), the vibration correcting unit 304 makes a correction to the vibration, determines time-series data about the XY coordinates of the finger from which the vibration has been removed, and outputs the time-series data to the image information creating unit 305 (step ST45). In contrast, when the vibration determining unit determines that the finger does not have a vibration whose amount is equal to or larger than the predetermined amount (if "NO" in step ST44), the vibration correcting unit 304 does not make any vibration correction, and then outputs the time-series data about the XY coordinates of the finger, which remain to be corrected, to the image information creating unit 305. The image information creating unit 305 creates an enlarged screen display of an image in a display area having a fixed range in the vicinity of the finger according to the time-series data about the XY coordinates of the finger outputted from the vibration correcting unit 304 (step ST46). More specifically, when the vibration determining unit determines that the vibration of the finger has an amount equal to or larger than the predetermined amount, the image information creating unit carries out the process of enlarging the image in the display area having the fixed range whose center is at the XY coordinates of the finger, from which the vibration has been removed, whereas when the vibration determining unit determines that the finger does not have a vibration whose amount is equal to or larger than the predetermined amount, the image information creating unit is carried out the process of enlarging the image in the display area having the fixed range whose center is at the XY coordinates of the finger, to which no vibration correction has been made.

An outline of the vibration correction carried out by the vibration correcting unit 304 is shown in FIG. 6 as a waveform chart. FIG. 6(a) shows time-series data about a vibration (cm) of the finger in the X-direction, which are created by the approaching coordinate position calculating unit 301, and which have been accumulated during the last 3 seconds, and FIG. 6(b) shows the time-series data on which an LPF (Low Pass Filter) process with a cut-off frequency of 3 Hz has been performed.

As can be understood from FIG. 6, because the vibration component of the finger is removed through the LPF process, when the vibration of the finger has an amount equal to or larger than the predetermined amount, the display input device can prevent the enlarged image in the display area having the fixed range in the vicinity of the finger from varying according to the vibration of the finger.

After the vibration correcting unit 304 has made the vibration correction, in order to carry out the process of enlarging the image in the display area having the fixed range displayed on the touch panel 1, the image information creating unit 305 which is started by the main control unit 300 reads the image (a key icon shown in a circle in the figure) in a partial area of the already-created soft keyboard from the image information storage area 322 of the memory 32 while skipping at fixed intervals of some pixels, and interpolates intermediate pixels to combine this image with image information (no enlargement) about a surrounding image into new image information, and update the soft keyboard image using the new image information, as shown in FIG. 5(a), for example.

The updated image information is outputted to the image information transferring unit 306 while the updated image information is stored in the image information storage area 322 of the memory 32. The image information transferring unit 306 receives the updated image information and then transfers this image information to the drawing circuit 31, and the drawing control unit 310 of the drawing circuit 31 expands the image information transferred thereto, and the drawing unit 312 draws the expanded image information into the bitmap memory unit 313 at a high speed. Finally, the display control unit 314 reads the image drawn in the bitmap memory unit 313 to create a desired screen display on the LCD panel 10 of the touch panel 1.

Returning the explanation to the flow chart of FIG. 4, when the touch sensor 11 of the touch panel 1 detects that the finger has touched an icon (if "YES" in step ST47), the touch coordinate position calculating unit 302 calculates the coordinate position of the touch and then starts the operation information processing unit 307.

The operation information processing unit 307 responds to this start command to carry out an operation process based on the key corresponding to the coordinates of the touch calculated by the touch coordinate position calculating unit 302 (step ST48). In the case in which the touched icon is a key of the soft keyboard, the operation process based on the key corresponding to the coordinates of the touch is the one of creating image information based on the key defined as the touched icon button, outputting to the image information transferring unit 306, and then displaying the image information on the touch panel 1 (the LCD monitor 10). In the case in which the touched icon is an icon button, the operation process based on the key corresponding to the coordinates of the touch is the one of carrying out a navigation process defined for the icon button, such as a destination search, creating image information, outputting the image information to the image information transferring unit 306, and then displaying the image information on the touch panel 1 (the LCD monitor 10).

As previously explained, in the display input device in accordance with Embodiment 1 of the present invention, when it is determined that a vibration of a finger detected by the proximity sensors 12 has an amount equal to or larger than the predetermined amount, the control unit 3 makes a vibration correction to the vibration and carries out a process of enlarging an image in a display area having a fixed range which is displayed on the touch panel 1 to display the enlarged image. Therefore, because the display input device in accordance with Embodiment 1 of the present invention can reduce the amplitude of sway of the image which is enlarged and displayed on the screen even though the finger is vibrating, the display input device can facilitate a user's input operation and improve its ease of use.

Figure 5:
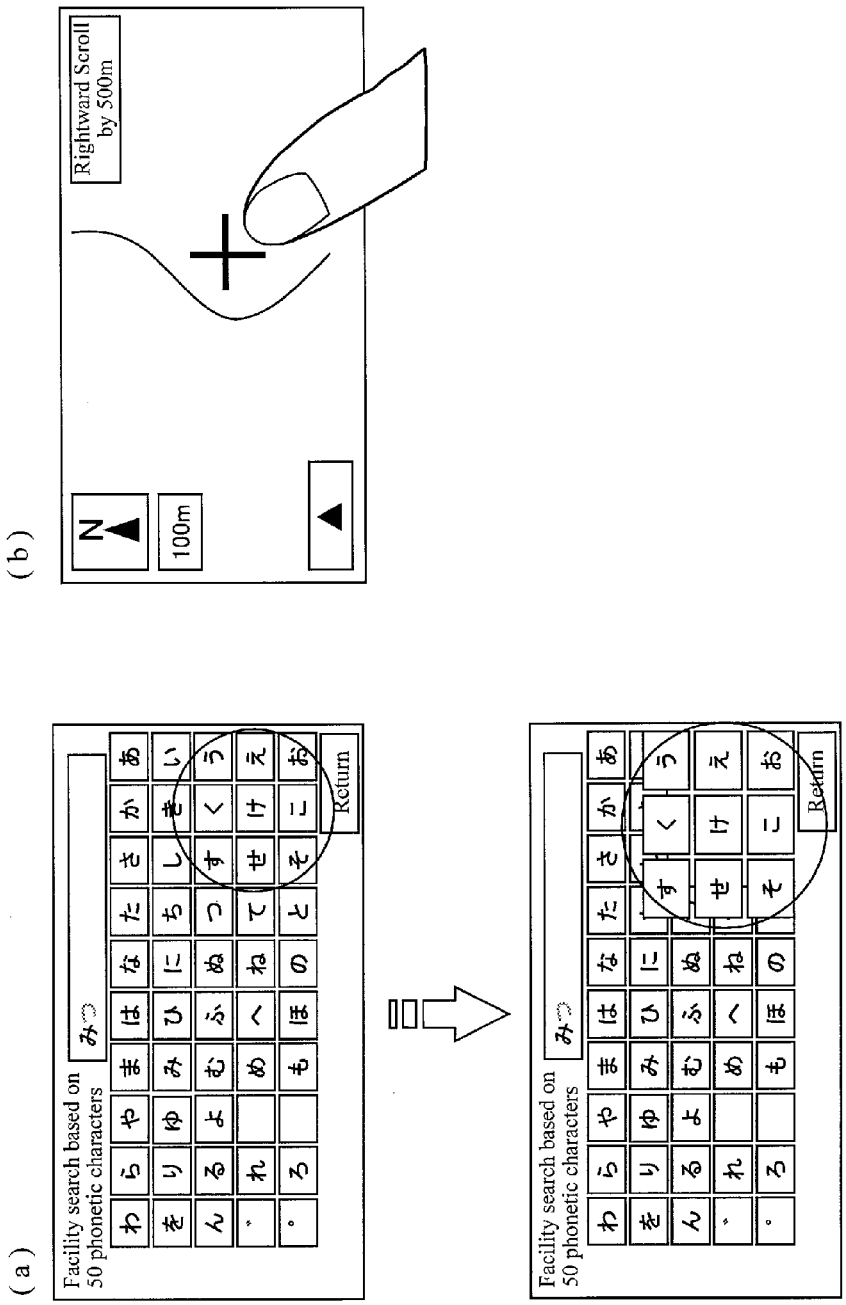
FIG. 5 is a view showing an example of the configuration of a screen displayed on a touch panel by the display input device in accordance with Embodiment 1 of the present invention.

In above-mentioned Embodiment 1, although an LPF is used for the vibration correction, in order for the display input device to handle quick movements of a user's finger, the vibration correcting process using the LPF can be prohibited when a movement over a predetermined distance of 5 cm or longer in a single direction is detected, for example. Furthermore, although in Embodiment 1 a screen image showing a facility search based on a phonetic alphabet of 50 characters with a software keyboard is illustrated as an image displayed in the display area having the fixed range, this embodiment can be alternatively applied to a crosshair cursor display screen as shown in FIG. 5(*b*) or a menu screen, for example. In this case, the same advantages can be provided. For the convenience of the explanation, although the explanation is made by paying attention only to a variation in the direction of the X axis, when the display input device in accordance with this embodiment is embodied, the display input device is preferably constructed in such a way as to carry out vibration corrections in a plane in consideration of both a variation in the direction of the X axis and a variation in the direction of the Y axis. In this case, because the variation in the direction of the Y axis can also be detected, the accuracy of the detection can be further improved. For the convenience of the explanation, although an LPF is explained as the filter used for the vibration correction, the filter is not limited to an LPF. For example, a Kalman filter or a moving average filter which acquires the average of the positions of an object measured during about last one second can be used. Generally, although a Kalman filtering process provides a good performance compared with an LPF, the CPU needs a larger amount of information to be processed.

In this embodiment, the application of the correction of a finger vibration to an enlarged display is shown as an example. However, this embodiment is not limited to this image control process. For example, this embodiment can also be applied to a case of detecting an approaching state of a finger and displaying a detailed explanation, such as a help message, in a balloon, and a case of displaying a cursor position.

Embodiment 2

Figure 7:
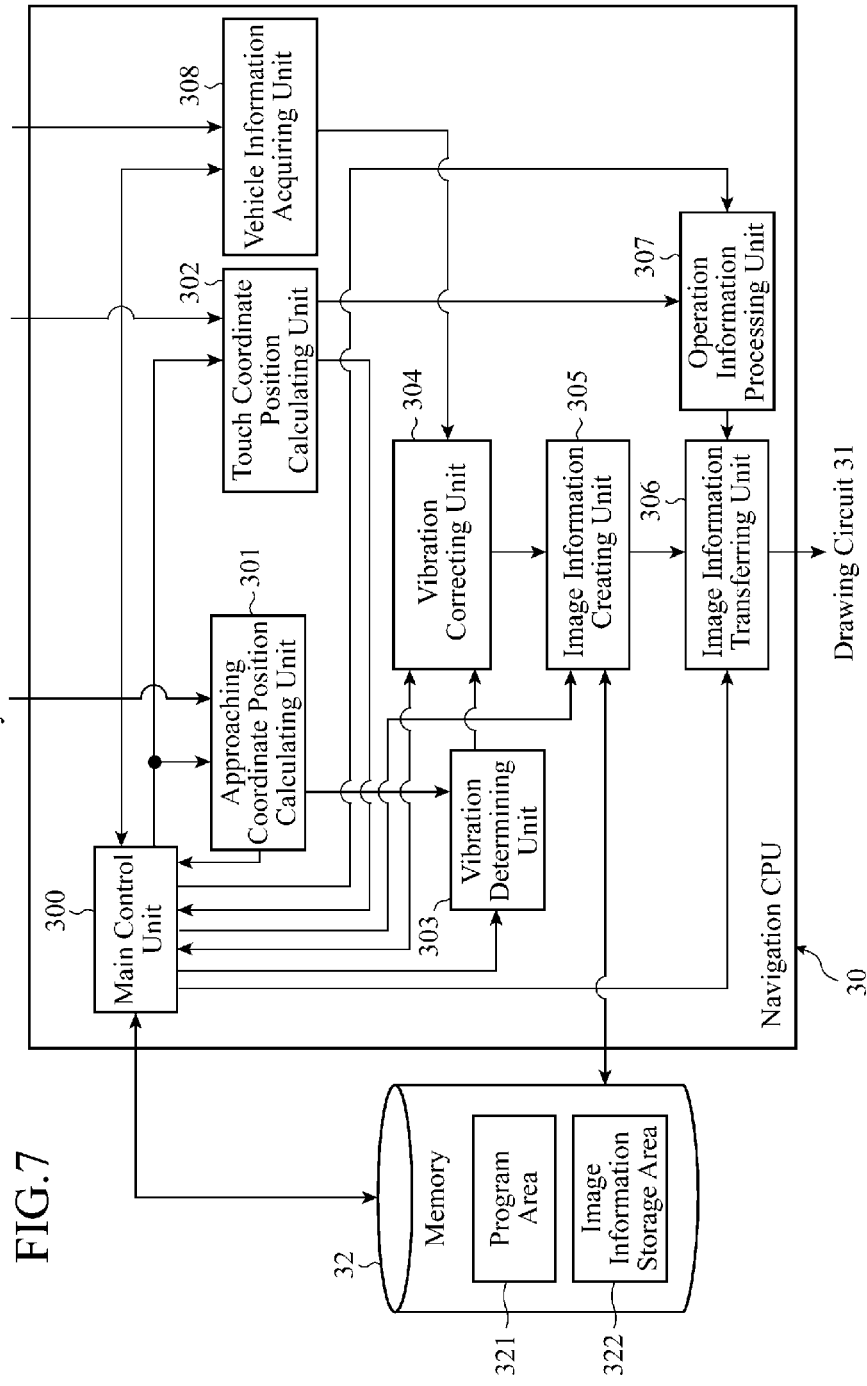
FIG. 7 is a block diagram showing a functional development of the program structure of a navigation CPU which a display input device in accordance with Embodiment 2 of the present invention has.

FIG. 7 is a block diagram showing a functional development of the structure of a program which a navigation CPU 30 which is a structural component of a control unit 3 of a display input device in accordance with Embodiment 2 of the present invention has. The structure of the program which this navigation CPU 30 has differs from that in accordance with Embodiment 1 shown in FIG. 2 in that a vehicle information acquiring unit 308 is added to the program structure which the navigation CPU 30 in accordance with Embodiment 1 has.

The vehicle information acquiring unit 308 has a function of acquiring a vehicle speed signal or an acceleration signal from external sensors 2 including a speed sensor 22 and an acceleration sensor 23, furnishes the vehicle speed signal or the acceleration signal to a main control unit 300 and a vibration correcting unit 304, and controls a vibration correcting process carried out by the vibration correcting unit 304.

Figure 8:
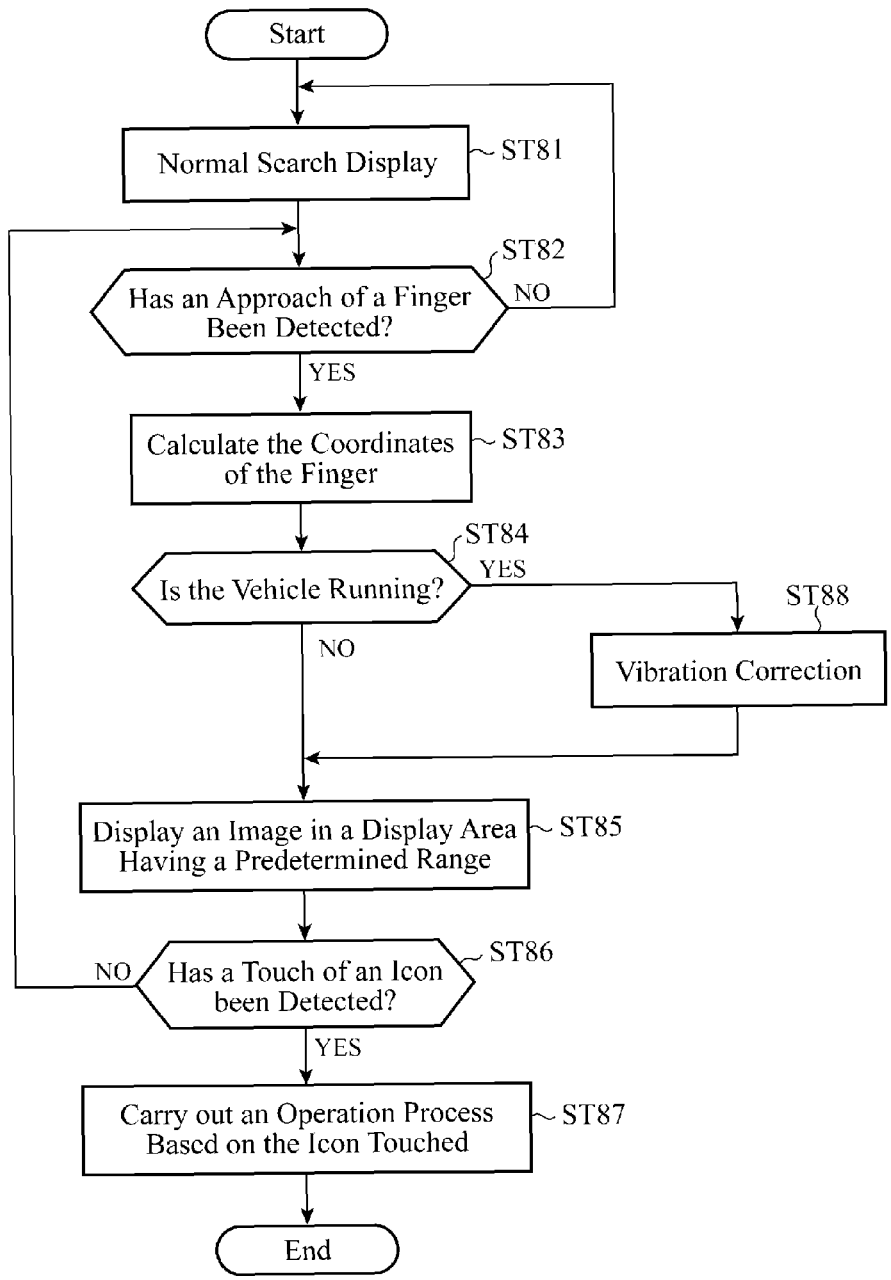
FIG. 8 is a flow chart showing the operation of the display input device in accordance with Embodiment 2 of the present invention.

FIG. 8 is a flow chart showing the operation of the display input device in accordance with Embodiment 2 of the present invention. Hereafter, the operation of navigation CPU 30 in accordance with Embodiment 2 will be explained in detail with reference to the flow chart of FIG. 8.

Because processes (steps ST81 to ST83) including from a normal search results display to a process of calculating the coordinates of a finger are the same as those of steps ST41 to ST43 of Embodiment 1 shown in the flow chart of FIG. 4, the explanation of the processes will be omitted to avoid any duplicate explanation. After an approaching coordinate position calculating unit 301 carries out a finger coordinate calculation, the vehicle information acquiring unit 308 acquires the vehicle speed signal measured by the speed sensor 22 of the external sensors 2, and then furnishes the vehicle speed signal to the main control unit 300 and the vibration correcting unit 304.

The main control unit 300 determines whether or not the vehicle is running from the vehicle speed signal (step ST84), and, when determining that the vehicle is at rest (if "NO" in step ST84), the main control unit does not carry out the vibration correction and an image information creating unit 305 carries out a process of enlarging an image in an display area having a fixed range in the vicinity of the finger according to time-series data about the XY coordinates of the finger (step ST85). In contrast, when determining that the vehicle is running (if "YES" in step ST84), the main control unit controls the vibration correcting unit 304 to make the vibration correcting unit perform the vibration correcting process on the vibration of the finger (step ST88), and the image information creating unit 305 carries out the process of enlarging an image in an display area having a fixed range in the vicinity of the finger according to time-series data about the XY coordinates of the finger from which the vibration component has been removed (step ST85).

In order to carry out the process of enlarging the image in the display area having the fixed range, the image information creating unit 305 reads the image of a partial area of the already-created soft keyboard from an image information storage area 322 of a memory 32 while skipping at fixed intervals of some pixels, and interpolates intermediate pixels to combine this image with image information (no enlargement) about a surrounding image into new image information, and update the soft keyboard image using the new image information.

The updated image information is outputted to the image information transferring unit 306 while the updated image information is stored in the image information storage area 322 of the memory 32. The image information transferring unit 306 receives the updated image information and then transfers this image information to the drawing circuit 31, and the drawing control unit 310 of the drawing circuit 31 expands the image information transferred thereto, and the drawing unit 312 draws the expanded image information into the bitmap memory unit 313 at a high speed. Finally, the display control unit 314 reads the image drawn in the bitmap memory unit 313 to create an enlarged screen display on an LCD panel 10 of a touch panel 1.

When the vibration determining unit 303 determines that the vibration of the finger has an amount equal to or larger than the predetermined amount, the vibration correcting unit 304 operates to carry out the vibration correcting process of correcting the vibration of the finger by performing a filtering process with a predetermined cut-off frequency on time-series data about vibrations previously measured (the frequency component of the vibration of the finger). The navigation CPU then controls the image information creating unit 305 via the main control unit 300 to make the image information creating unit 305 carry out the process of enlarging the image in the above-mentioned display area having the fixed range, and then transfers the image information created to the drawing circuit 31 via the image information transferring unit 306 to acquire a desired display on the LCD panel 10 of the touch panel 1 (step ST85).

When a touch sensor 11 of the touch panel 1 detects that the finger has touched an icon (if "YES" in step ST86), a touch coordinate position calculating unit 302 calculates the coordinate position of the touch and then starts a operation information processing unit 307. The operation information processing unit 307 then carries out an operation process based on the key corresponding to the coordinates of the touch calculated by the touch coordinate position calculating unit 302 (step ST87). This process is the same as that in accordance with Embodiment 1.

As previously explained, in the display input device in accordance with Embodiment 2 of the present invention, when the external sensors 2 determine that the vehicle is running, the control unit 3 carries out a vibration correction, whereas when the external sensors 2 determine that the vehicle is at rest, the control unit 3 does not carry out any vibration correction. Therefore, because vibration hardly occurs in the user's finger while the vehicle is at rest, the display input device can easily reflect the operator's intention therein without having to carry out the vibration correction forcedly. In addition, because the useless vibration correcting process can be eliminated and the speed of response can be increased, the speed of the enlarged display of the image information in the display area having the fixed range can be increased.

An acceleration sensor can be mounted in the touch panel 1 to detect a vibration of the touch panel 1, or the acceleration sensor 23 mounted in the vehicle can be constructed in such a way as to detect a vibration of the touch panel 1. In this case, when the touch panel 1 has a vibration whose amount is equal to or larger than a predetermined amount, the display input device carries out a control operation of making a vibration correction to the vibration, whereas when it is detected that the touch panel does not have any vibration whose amount is equal to or larger than the predetermined amount, the display input device carries out a control operation of not making any vibration correction. In this case, the same advantages can be provided.

Furthermore, as will be mentioned below, a vibration correction most suitable for the running state of the vehicle can be made by changing the intensity of the vibration correction according to the running speed of the vehicle. Because the occurrence of a vibration in the touch panel 1 means an environment in which the user's finger vibrates easily, the vibration correction can be made only when the vibration correction is required, the user-friendliness of the display input device can be improved without causing any bad influence on the speed of response of the display input device.

Embodiment 3

Figure 9:
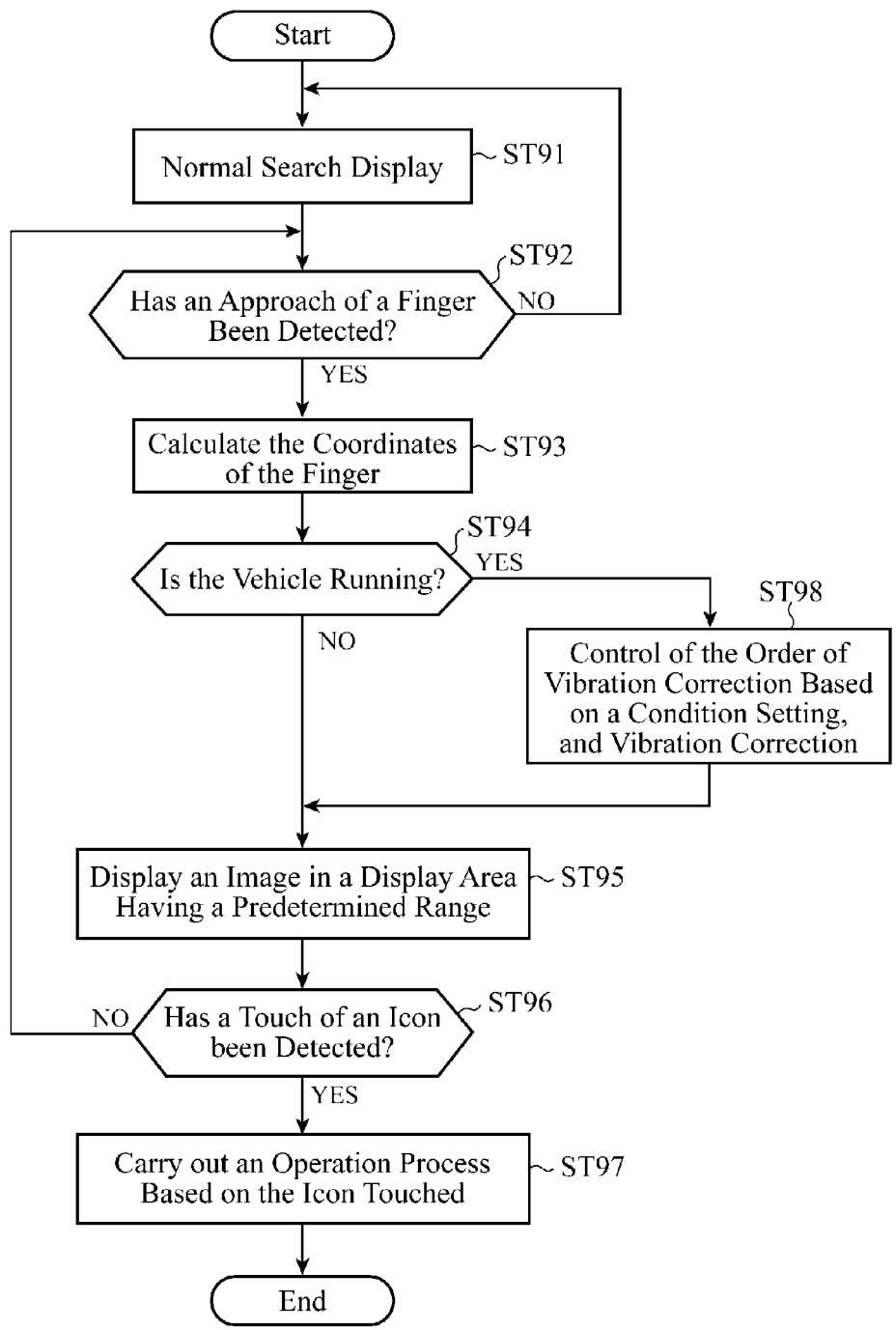
FIG. 9 is a flow chart showing the operation of a display input device in accordance with Embodiment 3 of the present invention.
Figure 10:
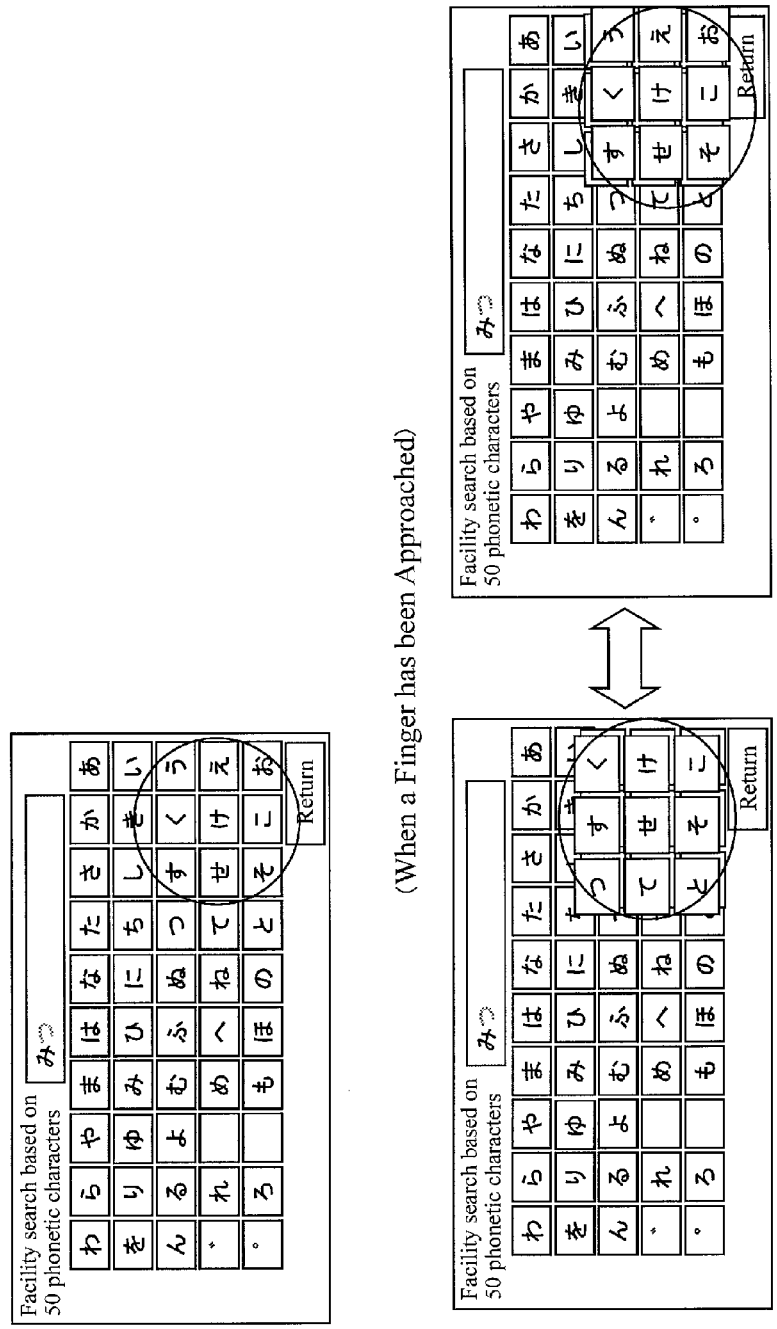
FIG. 10 is a view showing an example of the configuration of a screen displayed on a touch panel by a conventional display input device.

FIG. 9 is a flow chart showing an operation of a display input device in accordance with Embodiment 3 of the present invention, and shows an operation in a case of changing the intensity of vibration correction according to a condition.

In this embodiment, in a vibration correcting process of step ST98, a vibration correcting unit 304 changes the intensity of vibration correction according to the running speed of a vehicle. Concretely, when speed information from a speed sensor 22 of external sensors 2 which is acquired by a vehicle information acquiring unit 308 shows 0 km/h<vehicle speed<10 km/h, the vibration correcting unit 304 carries out an LPF process with a cut-off frequency of 5 Hz or a control operation of regarding the speed of response as important without making any vibration correction, whereas when the speed information shows vehicle speed>10 km/h, the vibration correcting unit 304 carries out a control operation of making a stronger vibration correction using an LPF process with a cut-off frequency of 3 Hz to suppress the vibration.

The vibration correcting unit 304 can alternatively change the intensity of vibration correction according to the type of an image in a display area having a fixed range which is displayed on a touch panel 1, instead of the above-mentioned vehicle speed.

For example, in the case of an icon display including the keys of a soft keyboard, the vibration correcting unit 304 carries out a strong vibration correction using an LPF process with a cut-off frequency of 3 Hz. In contrast, in the case of a cursor display, a rapid movement is required, and a measure for regarding the speed of response as important and therefore weakening the intensity of vibration correction by using a LPF process with a cut-off frequency intensity of 5 Hz is required in order to reflect the user's intention in the display input device. In order for the display input device to handle quick movements of a user's finger, it can be considered that the vibration correcting process is disabled when a movement over a predetermined distance of 3 cm or longer in a single direction is detected, for example.

As a result, a strengthened vibration correction can be made to a stationary icon and an easily readable large screen display of this stationary icon can be created, while a weakened vibration correction can be made to an icon having a movement and the user's intention can be reflected in the display input device.

Furthermore, in a case in which a three-dimensional coordinate position detectable touch panel that can measure a vertical distance (in a Z axis) from a panel surface is used, instead of the touch panel 1 shown in FIG. 1, the vibration correcting unit 304 can change the intensity of vibration correction according to the vertical distance.

For example, the vibration correcting unit strengthens and sets the intensity of vibration correction as the distance becomes short. In this case, input operations are facilitated. In this embodiment, the touch panel measures the vertical distance (in the Z axis) from the panel surface by using the technology disclosed by patent reference 2. As an alternative, the display input device can use a surveillance camera to measure the vertical distance (in the Z axis) of a finger from the panel surface through image processing.

In the above-mentioned structure, when the distance of approach between the panel and the finger is 0 (in a state which the finger is contact with the panel), the vibration correcting unit 304 does not perform any vibration correction using an LPF process, when 0<distance<=1 cm, the vibration correcting unit 304 performs an LPF process with a cut-off frequency of 3 Hz, when 1 cm<distance<=5 cm, the vibration correcting unit 304 performs an LPF process with a cut-off frequency of 5 Hz, and, when distance>5 cm, the main control unit 300 does not determine that the finger has approached the panel and therefore does not carry out a process of enlarging and displaying an image in a display area having a fixed range displayed on the touch panel 1, and, at that time, the vibration correcting unit 304 does not make any vibration correction as a matter of course.

In the flow chart of FIG. 9, because a series of processes starting from a normal search display and ending at a running determining process (steps ST91 to ST94), and processes (ST95 to ST97) of, after enlarging and displaying the image in the display area having the fixed range, detecting that the image is touched and carrying out an operation process according to the key corresponding to the coordinates of a part of the image which has been touched are the same as those of steps ST81 to ST84 and steps ST85 to ST87 of Embodiment 2 shown in FIG. 8 respectively, the explanation of the steps will be omitted hereafter to avoid any duplicate explanation.

As previously explained, in the display input device in accordance with Embodiment 3 of the present invention, by changing the intensity of vibration correction according to the cut-off frequency determined by the vehicle speed detected by the speed sensor 22 or the amount of vibration of the vehicle, changes the intensity of vibration correction according to the cut-off frequency determined by the type of an image in a display area having a fixed range displayed on the touch panel 1, or changing the intensity of vibration correction according to the cut-off frequency determined by the vertical distance between the panel surface and the finger, the control unit can select either a vibration correction which creates an easily readable screen display and regards the ease of the input operation as important or a vibration correction which regards the speed of response as important. Therefore, the display input device can make a vibration correction reflecting the user's intention and provide improved user-friendliness.

Each of the conditions (the vehicle speed, the type of the image to be displayed, and the vertical distance between the panel surface and the finger) which is set when setting up the above-mentioned intensity of vibration correction can be used independently or a combination of two or more of them can be used for the set-up. As a result, the user-friendliness is further improved. For the convenience of the explanation, the LPF is explained as an example of the filter for vibration correction, and the method of reducing the cut-off frequency is explained as an example of the strengthening of the intensity of vibration correction. As an alternative, the intensity of vibration correction can be changed by changing the filter coefficient of a filter, such as a Kalman filter, instead of the LPF. Generally, when the action of smoothing is strong, the speed of response becomes slow with respect to a rapid change, whereas when the action of smoothing is weak, the speed of response becomes high with respect to a rapid change. Embodiment 3 can also be implemented by preparing two or more filters having different filter coefficients, as shown above, and switching between them.

As previously explained, the display input device in accordance with any one of Embodiments 1 to 3 of the present invention is comprised of the touch panel 1 for carrying out a display of an image and an input of an image, the vibration sensor (the proximity sensors 12) for detecting a vibration of a finger which is positioned opposite to the touch panel 1, and the control unit 3 for making a vibration correction with a predetermined amount when it is determined that the vibration of the finger detected by the vibration sensor has an amount equal to or larger than the predetermined amount to carry out a process of enlarging an image in a display area having a fixed range displayed on the touch panel 1. Therefore, because the display input device can facilitate a user's input operation even when a vibration is occurring, thereby improving its ease of use.

In the above-mentioned display input device in accordance with any one of Embodiments 1 to 3, although only keys of the software keyboard are explained as an example of the image in the display area having the fixed range, a specific image, such as an icon which is a target for an input operation which is performed in order to carry out navigation, or a cursor can be the image in the display area having the fixed range. Furthermore, although only a finger is explained as an example of the object to be detected for the detection of a vibration, the object to be detected can be a pen or the like. Even in this case, the same advantages are provided.

In addition, although the acceleration sensor 23 mounted in the vehicle is explained as the sensor used for the detection of a vibration of the touch sensor 11, an acceleration sensor can be mounted in the touch panel 1 or the control unit 3, and, in this variant, a higher-precision vibration detection can be implemented because a vibration of the vehicle can be measured by the acceleration sensor 23 of the external sensors 2 and a vibration of the touch panel 1 can be measured by the acceleration sensor mounted in the touch panel 1 or the control unit 3

The functions of the navigation CPU 30 of the control unit 3 shown in FIG. 2 or 7 can be all implemented via hardware, or at least a part of the functions can be implemented via software.

For example, the data process of making a vibration correction with a predetermined amount when it is determined that the vibration of a finger detected by the vibration sensor (the proximity sensors 12) has an amount equal to or larger than a predetermined amount to carry out the process of enlarging an image in a display area having a fixed range displayed on the touch panel 1, which is carried out by the control unit 3, can be implemented via one or more programs on a computer, or at least a part of the data process can be implemented via hardware.

Industrial Applicability

Because the display input device in accordance with the present invention enables a user to easily perform an input operation even when a vibration is occurring, thereby improving its ease of use, the display input device in accordance with the present invention is suitable for use in vehicle-mounted information equipment of a navigation system, and so on.

The invention claimed is:

1. A display input device comprising:
a touch panel that carries out a display of an image and receives an input;
a vibration sensor that detects a vibration of an object to be detected which is positioned opposite to said touch panel on a basis of a change in a position of the object to be detected;
a vibration correcting unit that makes a vibration correction to remove a vibration component from the change of the position of said object to be detected when the vibration of the object to be detected which is detected by said vibration sensor has an amount equal to or larger than a predetermined amount; and
a controller that carries out a process of transforming an image in a display area having a fixed range displayed on said touch panel according to the position of the object to be detected to which the vibration correction has been made,
wherein the fixed range of the display area is not an entire area of the touch panel,
wherein said controller makes said vibration correction by performing a filtering process with a predetermined cut-off frequency on a waveform of the vibration of said object to be detected, and
wherein said controller changes intensity of the vibration correction according to filter characteristics which are predetermined dependently upon a type of the image in the display area having the fixed range displayed on said touch panel.

2. A display input device comprising:
a touch panel that carries out a display of an image and receives an input;
a vibration sensor that detects a vibration of an object to be detected which is positioned opposite to said touch panel on a basis of a change in a position of the object to be detected;
an external sensor that detects a state of a vehicle;
a vibration correcting unit that makes a vibration correction to remove a vibration component from the change of the position of said object to be detected when said external sensor determines that the vehicle is running; and
a controller that carries out a process of transforming an image in a display area having a fixed range displayed on said touch panel according to the position of the object to be detected to which the vibration correction has been made,
wherein if the external sensor determines that the vehicle is at rest, the controller does not carry out the process of transforming the image.

3. The display input device according to claim 2, wherein said external sensor includes a speed sensor that detects a speed of said vehicle, and an acceleration sensor that detects a vibration while said vehicle is running.

4. The display input device according to claim 3, wherein said controller changes intensity of the vibration correction according to filter characteristics which are determined dependently upon the vehicle speed detected by said speed sensor or the vibration detected by said acceleration sensor.

5. The display input device according to claim 1, wherein said vibration sensor is a proximity sensor that detects the vibration of the object to be detected, which is positioned opposite to said touch panel, in a non-contact manner.

6. A display input device comprising:
a touch panel that carries out a display of an image and receives an input;
a vibration sensor that detects a vibration of an object to be detected which is positioned opposite to said touch panel on a basis of a change in a position of the object to be detected;
a vibration correcting unit that makes a vibration correction to remove a vibration component from the change of the position of said object to be detected when the vibration of the object to be detected which is detected by said vibration sensor has an amount equal to or larger than a predetermined amount; and
a controller that carries out a process of transforming an image in a display area having a fixed range displayed on said touch panel according to the position of the object to be detected to which the vibration correction has been made,
wherein the fixed range of the display area is not an entire area of the touch panel,
wherein said controller makes said vibration correction by performing a predetermined filtering process on a waveform of the vibration of said object to be detected, and
wherein said controller changes intensity of the vibration correction according to filter characteristics which are predetermined dependently upon a type of the image in the display area having the fixed range displayed on said touch panel.

7. A display input device comprising:
a touch panel that carries out a display of an image and receives an input;
a vibration sensor that detects a vibration of an object to be detected which is positioned opposite to said touch panel on a basis of a change in a position of the object to be detected;
a vibration correcting unit that makes a vibration correction to remove a vibration component from the change of the position of said object to be detected when the vibration of the object to be detected which is detected by said vibration sensor has an amount equal to or larger than a predetermined amount; and
a controller that carries out a process of transforming an image in a display area having a fixed range displayed on said touch panel according to the position of the object to be detected to which the vibration correction has been made,
wherein the fixed range of the display area is not an entire area of the touch panel,
wherein said controller makes said vibration correction by performing a filtering process with a predetermined cut-off frequency on a waveform of the vibration of said object to be detected, and
wherein said controller detects a vertical distance of the object to be detected, which is positioned opposite to said touch panel, by using said vibration sensor, and changes intensity of the vibration correction according to filter characteristics which are determined dependently upon said vertical distance.

8. A display input device comprising:
a touch panel that carries out a display of an image and receives an input;
a vibration sensor that detects a vibration of an object to be detected which is positioned opposite to said touch panel on a basis of a change in a position of the object to be detected;
a vibration correcting unit that makes a vibration correction to remove a vibration component from the change of the position of said object to be detected when the vibration of the object to be detected which is detected by said vibration sensor has an amount equal to or larger than a predetermined amount; and a controller that carries out a process of transforming an image in a display area having a fixed range displayed on said touch panel according to the position of the object to be detected to which the vibration correction has been made, wherein the fixed range of the display area is not an entire area of the touch panel, wherein said controller makes said vibration correction by performing a predetermined filtering process on a waveform of the vibration of said object to be detected, and wherein said controller detects a vertical distance of the object to be detected, which is positioned opposite to said touch panel, by using said vibration sensor, and changes intensity of the vibration correction according to filter characteristics which are determined dependently upon said vertical distance.

9. The display input device according to claim 2, wherein the fixed range of the display area is not an entire area of the touch panel.

10. The display input device according to claim 6, wherein said vibration sensor is a proximity sensor that detects the vibration of the object to be detected, which is positioned opposite to said touch panel, in a non-contact manner 11. The display input device according to claim 7, wherein said vibration sensor is a proximity sensor that detects the vibration of the object to be detected, which is positioned opposite to said touch panel, in a non-contact manner.

12. The display input device according to claim 8, wherein said vibration sensor is a proximity sensor that detects the vibration of the object to be detected, which is positioned opposite to said touch panel, in a non-contact manner.

* * * * *